UNITED STATES PATENT OFFICE.

FRANZ O. MATTHIESSEN, OF IRVINGTON, NEW YORK.

IMPROVEMENT IN PROCESSES OF REFINING SUGAR.

Specification forming part of Letters Patent No. 169,823, dated November 9, 1875; application filed September 4, 1875.

*To all whom it may concern:*

Be it known that I, FRANZ O. MATTHIESSEN, of Irvington, New York, have invented an Improved Process of Refining Raw Sugar, of which the following is a specification:

In refining raw sugar it has sometimes been the practice heretofore to wash the raw sugar with water, steam, or sirup, for the purpose of separating the coloring matter from it. Washing with sirup is preferable, because the sirup dissolves the least proportion of sugar. By this means the larger proportion of the raw sugar is rendered nearly pure prior to boiling in the vacuum-pan. The liquor used in washing the raw sugar, in addition to carrying off the coloring matter and other impurities from the sugar, takes with it a considerable proportion of sugar. When water is used this proportion may amount to, say, twenty per cent. of the whole quantity of sugar present in the raw state.

Heretofore these washings from the raw sugar have been introduced at once into the vacuum-pan, and boiled in the ordinary way. Owing to the large proportion of coloring matter present, the liquid residuum, after the separation of the sugar from the washings, is very dark colored, and is known as black-strap, and brings but a small price in the market.

My improvement consists in subjecting the washings from the raw sugar to chemical treatment, for the purposes of decolorization and purification, prior to their introduction into the vacuum-pan, and in this way utilizing the entire quantity of sugar contained in the washings, and avoiding the necessity heretofore existing of selling a portion of the sugar in the form of black-strap, or a sirup so dark-colored as to be only fit for distiller's use.

There are several well-known modes of chemical treatment which may be usefully employed for decolorizing the washings, and it will be sufficient for me to describe one of them, the gist of my invention being chemically treating the washings prior to their introduction into the vacuum-pan. To proceed, therefore, I wash the raw sugar in the ordinary way, using either water, steam, or sirup, as the case may be, and treat the washed sugar by the ordinary refining processes. I collect the washings in a suitable vessel, and add thereto one-half to five per cent. or more of lime, and then inject carbonic-acid gas into the mixture until precipitation ceases. The quantity of lime is varied according to the quantity of coloring-matter present, the various raw sugars differing considerably in color. For example, the Manilla and low grade Mauritius sugars are very dark, owing to imperfect methods of boiling the cane-juice.

In conducting my process, the operator will easily discover, by trial, the percentage of lime required in each case, and that percentage is calculated upon the quantity of solid matter contained in the washing. For example, if a hundred pounds of raw sugar is washed, and seventy-five pounds of washed sugar remains, the operator will know that he has twenty-five pounds of sugar in the washings, and having ascertained the proper proportion of lime required for the particular lot of sugar which is being treated, he will introduce it into the washing accordingly.

The washing having been chemically treated for decolorization, is then run over a bag-filter to separate the solid matters from the liquid. A considerable portion of the coloring matter is thus chemically separated from the washing, which is then filtered through bone-charcoal, and further decolorized. The chemical treatment is employed first, in order to give the charcoal as little to do as possible. The filtered washing is then introduced into the vacuum-pan, and evaporated in the usual way, and the magma is either treated in the centrifugal machine to separate the sugar crystals from the sirup, or is filled into sugar-molds and converted into coffee-sugar, so called, in which latter case the small proportion of sirup present is adherent to the sugar crystals.

By this process the coloring matters present in raw sugar are chemically treated separately in as condensed a form as possible, and the quantity of sugar combined with them is wholly utilized, while the larger proportion of the raw sugar, by the act of washing, is rendered nearly pure preparatory to the refining process.

What I claim as my invention is—

The improved process of refining raw sugar herein described, which consists in washing the raw sugar, and thus eliminating its coloring matters, as heretofore practiced, and in then decolorizing and filtering the washing preparatory to introducing the washing into the vacuum-pan for evaporation, and subsequent treatment in the ordinary ways.

F. O. MATTHIESSEN.

Witnesses:
ROBT. MOELLER,
P. J. MURPHY.